United States Patent
Sun

(10) Patent No.: US 7,889,790 B2
(45) Date of Patent: Feb. 15, 2011

(54) METHOD AND APPARATUS FOR DYNAMICALLY ADJUSTING QUANTIZATION OFFSET VALUES

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1456 days.

(21) Appl. No.: 11/313,553

(22) Filed: Dec. 20, 2005

(65) Prior Publication Data

US 2007/0140334 A1    Jun. 21, 2007

(51) Int. Cl.
*H04B 1/66* (2006.01)
*G06K 9/36* (2006.01)
(52) U.S. Cl. .................. 375/240.03; 382/236
(58) Field of Classification Search ............ 375/240.03, 375/240.16, 240.25, 243, 267, 240.26; 382/236, 382/253, 239, 251, 293; 358/426.04; 348/580, 348/231.99, 333.01
See application file for complete search history.

(56) References Cited

U.S. PATENT DOCUMENTS

| | | |
|---|---|---|
| 6,148,107 A | 11/2000 | Ducloux et al. |
| 6,731,686 B1 * | 5/2004 | Sudharsanan et al. .. 375/240.25 |
| 2006/0080268 A1 * | 4/2006 | Afeyan et al. .................. 706/13 |
| 2006/0133479 A1 * | 6/2006 | Chen et al. ............. 375/240.03 |
| 2008/0260276 A1 * | 10/2008 | Yamatani et al. ............ 382/249 |

FOREIGN PATENT DOCUMENTS

EP    0 705 040 A2    4/1996

* cited by examiner

*Primary Examiner*—Saeid Ebrahimi Dehkordy
(74) *Attorney, Agent, or Firm*—Stolowitz Ford Cowger LLP

(57) ABSTRACT

An encoding scheme dynamically adjusts a quantization rounding offset parameter used for encoding pictures according to statistics of previously encoded pictures of similar type. A look-up table can be used to store different relative quantization rounding offset parameters associated with different numbers of bits required to encode the pictures. The dynamically adjusted quantization rounding offset scheme achieves better coding performance at high bit rates. In one example, the dynamic quantization offset values are applied to a Uniform-Reconstruction-Quantizer (URQ) used for Laplacian sources.

18 Claims, 7 Drawing Sheets

RELATIONSHIP BETWEEN H (AVERAGE NUMBER OF BITS PER SAMPLE) AND RELATIVE OFFSET δ/s

PERFORMANCE COMPARISON BETWEEN PRE-FIXED
OFFSET AND ADAPTIVE OFFSET (mobile_cif)

PERFORMANCE COMPARISON BETWEEN PRE-FIXED
OFFSET AND ADAPTIVE OFFSET (harbour_4cif)

METHOD AND APPARATUS FOR DYNAMICALLY ADJUSTING QUANTIZATION OFFSET VALUES

BACKGROUND

Most quantization related schemes adjust quantization parameters to control picture quality and bit allocation. For example, a block based signal compression system employs quantization of codewords or transform coefficients and includes circuitry for adaptively controlling the quantization. Adaptivity of quantization may be a function of coding cost or bandwidth. Coding cost may be determined on a macroblock basis but averaged over a window of macroblocks centered on a macroblock currently being quantized. Other block or macroblock motion attributes can also be used to modify the quantizing function. However, these encoding schemes do not address the problems associated with quantization threshold or rounding.

For example, in existing video encoding systems, quantization offset parameters are typically pre-fixed constants, such as ½, ⅓, and ⅙, etc. In the H.264 reference software encoder, which is considered as a collection of many state-of-art video encoding tools, the relative quantization rounding offset is set to ⅓ for all Intra modes, while the rounding offset is set to ⅙ for all Inter modes.

These and other picture encoding schemes evaluate data quantity from stored picture data and detect inter-picture correlation. Picture data compression is then adaptively selected based upon the evaluated value of the information quantity and the inter-picture correlation information. The basic quantization step is then adaptively adjusted according to bit allocation and picture correlation. However, problems associated with quantization rounding are not taken into account.

The present invention addresses this and other problems associated with the prior art.

SUMMARY OF THE INVENTION

An encoding scheme dynamically adjusts a quantization rounding offset parameter used for encoding pictures according to statistics of previously encoded pictures of similar type. A look-up table can be used to store different relative quantization rounding offset parameters associated with different numbers of bits required to encode the pictures. The dynamically adjusted quantization rounding offset scheme achieves better coding performance at high bit rates. In one example, the dynamic quantization offset values are applied to a Uniform-Reconstruction-Quantizer (URQ) used for Laplacian sources.

The foregoing and other objects, features and advantages of the invention will become more readily apparent from the following detailed description of a preferred embodiment of the invention which proceeds with reference to the accompanying drawings.

DETAILED DESCRIPTION

Figure 1:
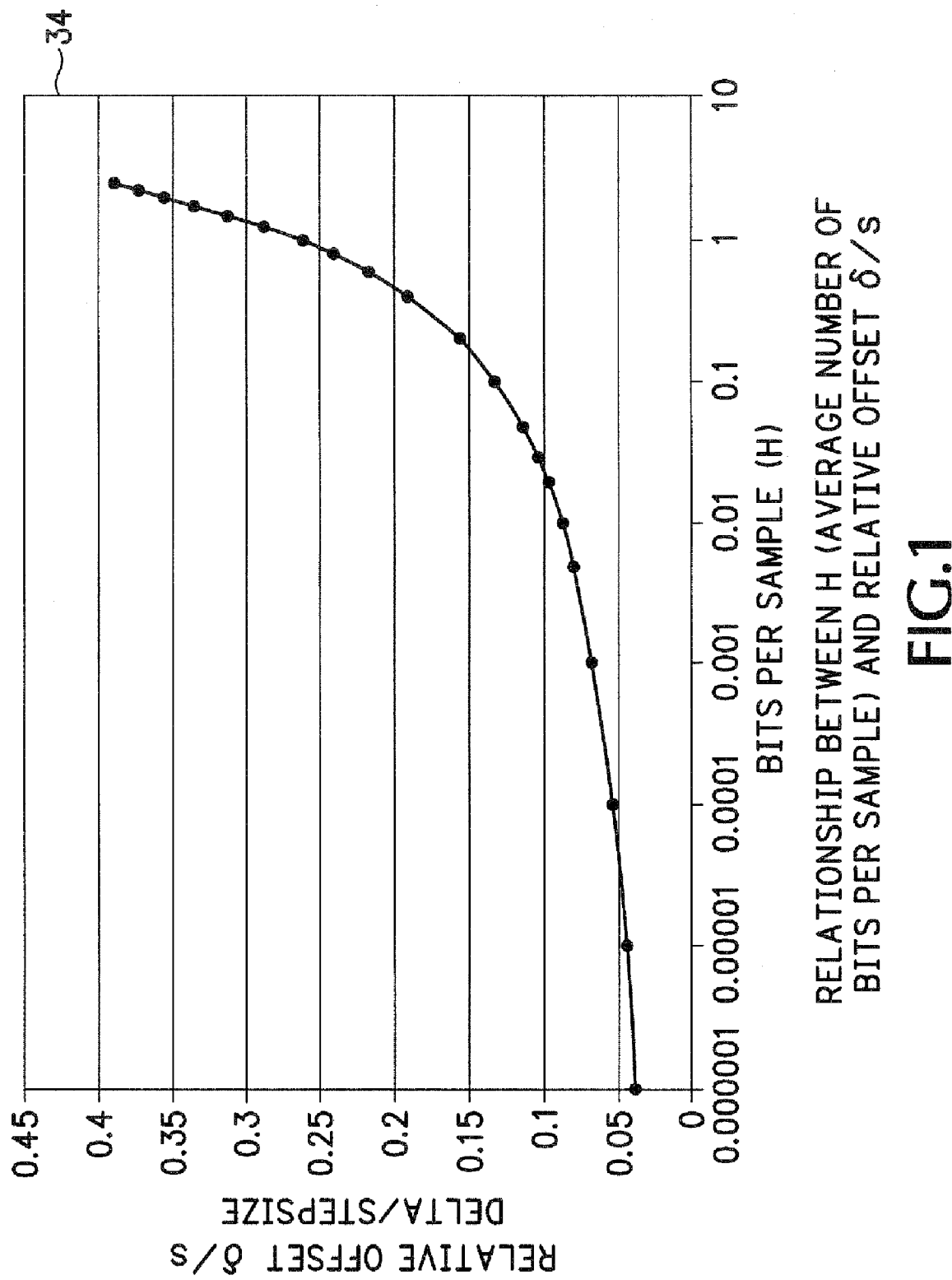
FIG. 1 is a graph showing the relationship between an average number of bits per sample and relative quantization offset values.

A Uniform-Reconstruction-Quantizer (URQ) has been used in many compression systems. Compared to other quantizers, the advantage of URQ is its simplicity on the decoder side and negligible rate-distortion performance difference from the optimal quantizers. The H.264 encoding scheme is a typical example of a compression standard that uses URQ and is herein incorporated by reference.

A set of optimal relative quantization offset parameters can be identified for each reconstruction level and used to achieve improved encoding performance in the URQ. The rate-distortion performance difference between the optimal multi-adaptive offset URQ and URQ-with-single-adaptive offset is quite small for some input sources, such as Laplacian sources. Therefore, to ease computational requirements, a single relative quantization offset parameter can be applied to all quantization levels, as in the latest H.264 JM software.

For a typical rate-distortion constrained quantizer, the cost function is formulated as $$\text{Cost} = D + \lambda H \tag{1}$$

where D represents the distortion, H represents the entropy or number of bits per sample after quantization, and the Lagrange multiplier $\lambda$ represents a relative weighting factor between the distortion and the entropy.

For URQ-with-single-adaptive offset, the optimal solution is the single quantization rounding offset value that minimizes the cost function for a given quantization step size. More specifically, for Laplacian sources with variance as $\sigma^2 = 2$ (without loss of generality)

$$\lambda = \ln 2 \cdot \frac{(s-\delta)^2 - \delta^2}{s} \tag{2}$$

and $$H = B(e^{-T}) + e^{-T}[1 + B(e^{-s})/(1 - e^{-s})] \tag{3}$$

$$D = \gamma(T,0) + \gamma(s,\delta)e^{-T}/(1 - e^{-s}) \tag{4}$$

where s represents the quantization step size and $$B(p) = -p\log_2(p) - (1-p)\log_2(1-p) \tag{5}$$

$$\gamma(a,b) = (b^2 - 2b + 2)(1 - e^{-a}) - ae^{-a}(a - 2b + 2) \tag{6}$$

$$T = 2(s - \delta) \tag{7}$$

and the optimal solution of single rounding offset $\delta$ can be approximated as $$\delta = 1 - \frac{se^{-s}}{1 - e^{-s}} \tag{8}$$

It is believed that distribution of transform coefficients in H.264 is close to a Laplacian distribution. Therefore, Eq. 8 can be applied to derive the improved adaptive quantization rounding offset parameter. However, in Eq. 8, the offset is represented as a function of quantization step size, which is different from the actual quantization step size in H.264 as s here is scaled for a source with variance equal to 2. In other words, in one embodiment, the statistics of the transform coefficients may need to be tracked to calculate the signal variance, which requires additional processing capacity and computation cycles.

A look-up table based technique can be used to solve the problem with tracking transform coefficient statistics. Since both $\delta$ and H are monotonic functions of s, $\delta$ can be considered a function of H, i.e., average number of bits per sample. In one embodiment, the relative offset is provided as the ratio between $\delta$ and s.

FIG. 1 shows one example of the relationship between the number of coefficient bits per sample (H) and the optimized relative quantization offset ($\delta/s$). Of course this is only one example of relative offset values that can be used for different input data entropy. In the example of FIG. 1, the number of bits per sample (H) and the associated relative quantization offset values are loaded into a look-up table 34 (see FIG. 3) as discrete values.

There could be a variety of different techniques used for generating the values in FIG. 1. In one embodiment, the relative quantization offset values are derived from sample transform data and then loaded into a look-up table prior to operation in an encoder. Alternatively, the relative quantization offset values may be generated on the fly in real-time during the encoding process according to Eq. 8 and the identified bits per sample for the encoded data.

The one-dimensional array, or look-up table 34, allows a relative quantization offset value to be derived for any entropy value using a simple linear interpolation. The process of conducting a linear interpolation between discrete points is well known to those skilled in the art and is therefore not described in further detail.

The adaptive quantization offset values can also be varied for different types of data. For example, data frames or sub-blocks that generally have a relatively low entropy may use a first set of relative offset table entries and frames or sub-blocks that have a relatively high entropy may use a second set of relative offset table entries. Also as described above, the relative quantization offset values may be used with a Uniform-Reconstruction-Quantizer (URQ) that has uniform quantization step sizes. Alternatively, the relative offset values could be used in quantizers with non-uniform quantization step sizes that may vary for different quantization step levels.

Figure 2:
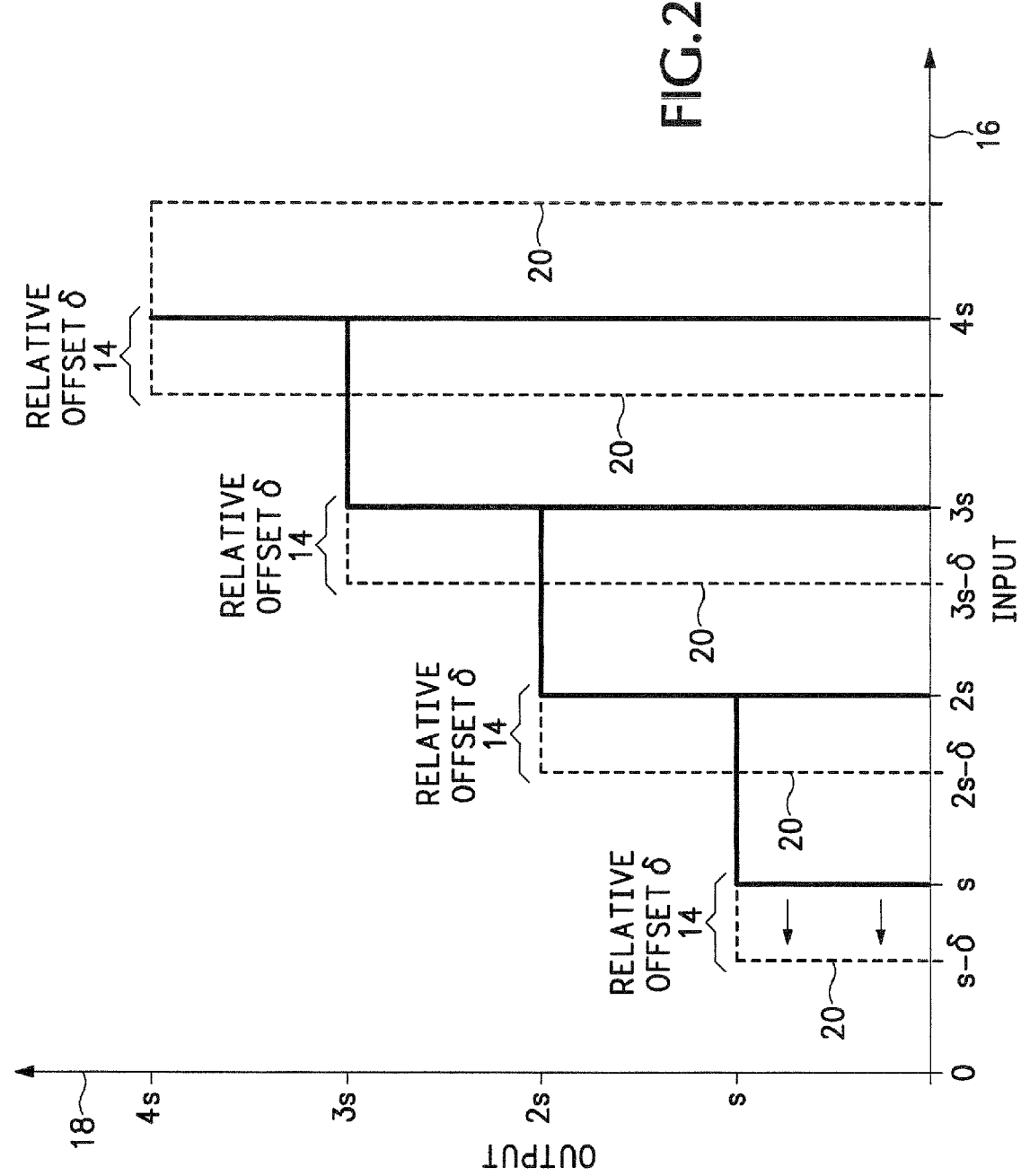
FIG. 2 is a graph showing how the relative quantization offset values are applied to basic quantization set sizes.

FIG. 2 shows graphically how the relative quantization offset values 14 are applied to the Uniform-Reconstruction-Quantizer (URQ). A horizontal line 16 is associated with input data that needs to be quantized. In this example, the input 16 may be transform coefficients derived from encoded image data. The vertical line 18 represents the quantized output values that are output for different ranges of input values 16.

For example, input values 16 between zero and a quantization step size s may be quantized to the same quantized output value 0. Input values 16 between quantization step size value s and 2s are quantized to the same quantized output value of s, input values 16 between quantization step size 2s and 3s are quantized to the same quantized output value 2s, etc. The actual output values of course may be different than the values shown in FIG. 2.

An adaptive quantization offset or roundoff value 14 ($\delta$) is derived according to the data entropy as described above and then applied to the basic quantization step size values s. The adapted quantization step size is shown as dashed lines 20 in FIG. 2. As can be seen, the adapted quantization offset 14 in this example shifts the quantization threshold values between the different quantization steps an amount $\delta$ to the left.

In this example, the adaptive quantization offset value 14 is simply subtracted from each the quantization step size values s. Accordingly, the quantized output value 18 is zero when the input data 16 is between zero and s-$\delta$, s when the input data is between s-$\delta$ and 2s-$\delta$, 2s when the input data is between 2s-$\delta$ and 3s-$\delta$, etc. In other embodiments, the relative quantization offset value $\delta$ might be added to the quantization values or multiplied by some constant value prior to being applied to the base quantization step size. Other algorithms can also be used for applying the offset values to the quantization step size depending upon how the offset values and quantization values are derived.

Figure 3:
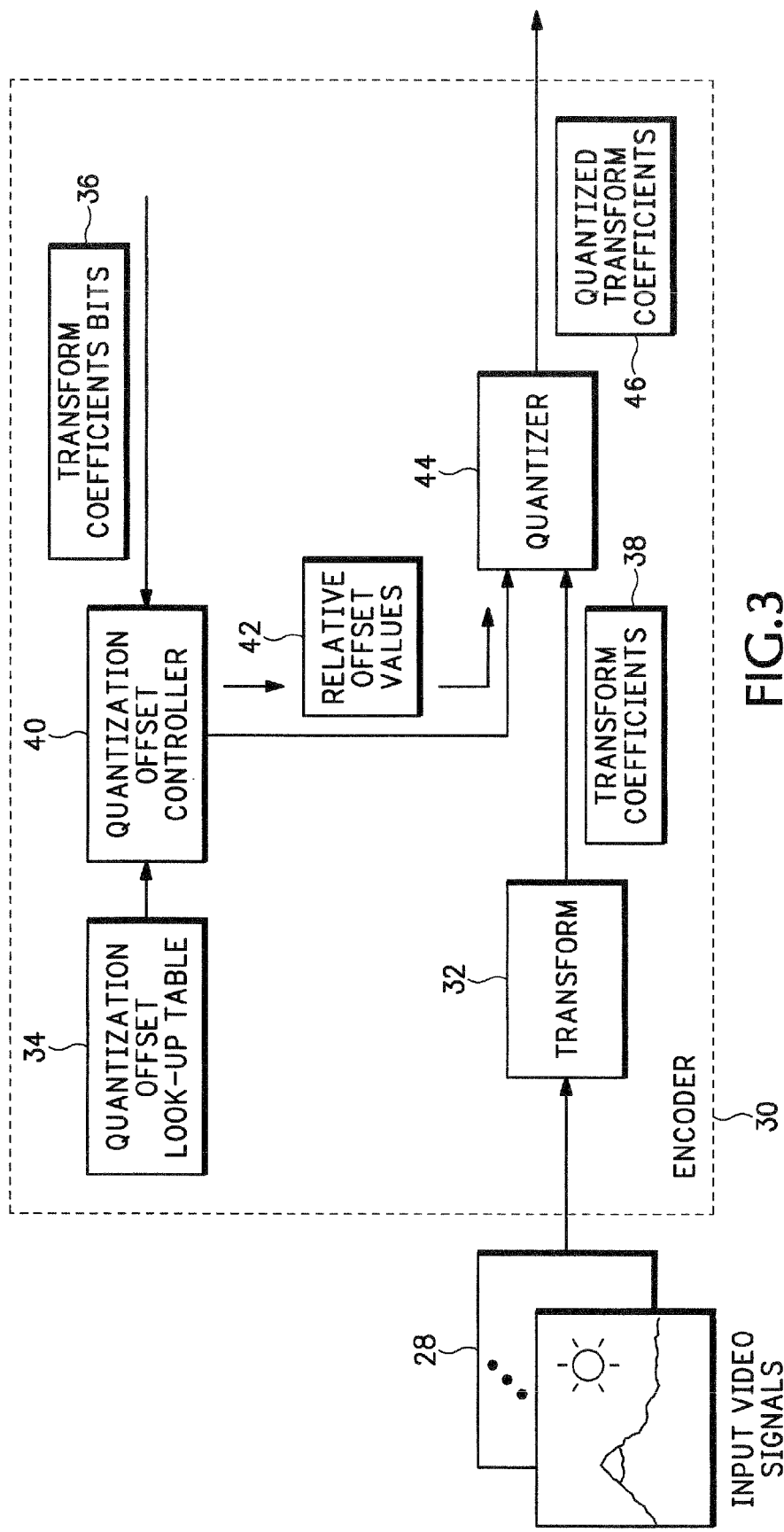
FIG. 3 is a block diagram of an encoder that uses the relative quantization offset scheme.

FIG. 3 shows one example of an encoder 30 that uses the adaptive quantization offset scheme described above. The encoder 30 conducts a transform operation 32 on received input video frames 28. The transform operation 32 generates transform coefficients 38 that are then quantized by a quantizer operation 44. Some part of the encoding operation 30 identifies the average number of bits 36 used to encode a coefficient according to previously encoded transform coefficients 38. It may require more bits to encode an input video frame 28 containing a relatively large amount of information and require fewer bits to encode an input video frame 28 with a relatively small amount of information. For example, a video frame of a non-moving relatively uniform blue sky may require fewer transform coefficient bits than a video frame that shows a portion of a car chase scene. Thus, the number of transform coefficient bits 36 is related to the amount of entropy in the input video signal 28.

A quantization offset controller 40 uses the number of transform coefficient bits 36 as a lookup index into a quantization offset look-up table 34. The look-up table 34 for example contains the bits per sample vs. relative offset values shown in FIG. 1. The controller 40 identifies the relative quantization offset value 42 in table 34 corresponding to the identified average number of bits 36. The bit number 36 may reside between two values in look-up table 34. In this case and as described above, the quantization offset controller 40 may conduct an interpolation using the two quantization offset values that are associated with the two entries in table 34 immediately above and below the identified bit number 36.

The identified or derived relative quantization offset value 42 is then used by the quantizer operation 44 for adaptively modifying the current quantizer step size as described above in FIG. 2. The quantized transform coefficients 46 are then output from quantizer 44 for possibly further predictive and entropy encoding before being transmitted, stored, etc.

Figure 4:
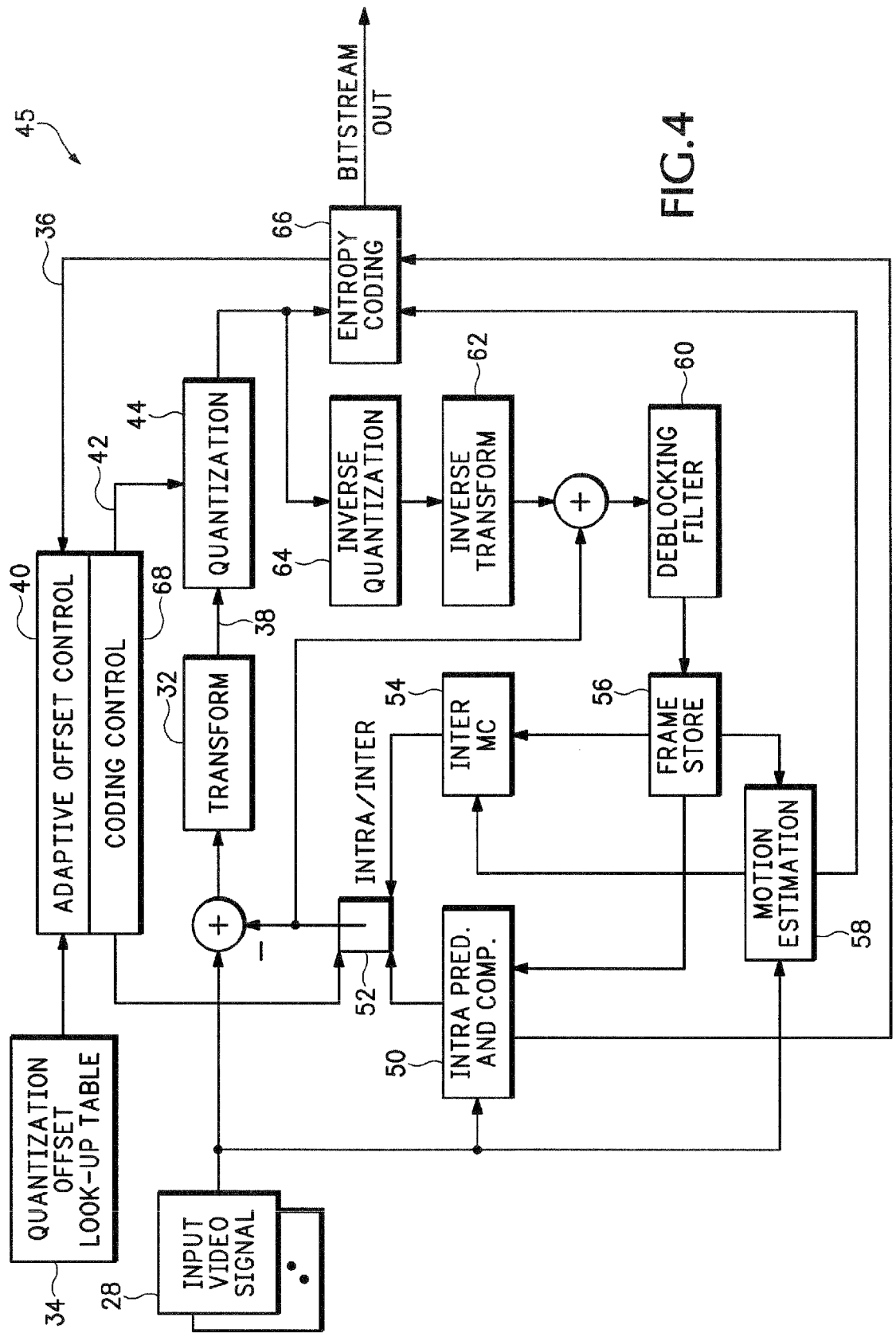
FIG. 4 is a more detailed diagram of a predictive encoder that uses the relative quantization offset scheme.

FIG. 4 shows a more detailed view of predictive coder, such as used in the H.264 encoding structure that can use the adaptive quantization offset scheme described above. In this embodiment, a coding control operation 68 also provides adaptive quantization offset control 40. In the predictive encoder 45, the output of quantization operation 44 is fed both into an entropy coding operation 66 and an inverse quantization operation 64. The output of the inverse quantization operation 64 is fed into an inverse transform operation 62. The inverse transformed data and intra/inter predicted data 52 are fed into a deblocking filter 60.

A frame store 56 outputs the results from the deblocking filter 60 into a motion estimation operation 58, an inter-block motion compensator 54, and an intra-block prediction and compensator operation 50. The outputs for operations 50 and 54 provide the intra/inter prediction data 52. The residuals from the predicted data 52 and the input video signals 28 are fed into transform operation 32.

In this example, the bit information 36 identifying the number of bits used for coding the input video signal 28 is derived by the entropy coding operation 66. The entropy coding operation 66 receives the quantized transform coefficients and then identifies a number of bits 36 used for encoding a frame in the input video signals 28. The controller 40 uses the bit information 36 to identify the adaptive quantization offset values 42. The identified offset values are then used by the quantization operation 44 for quantizing the transform coefficients 38.

Figure 5:
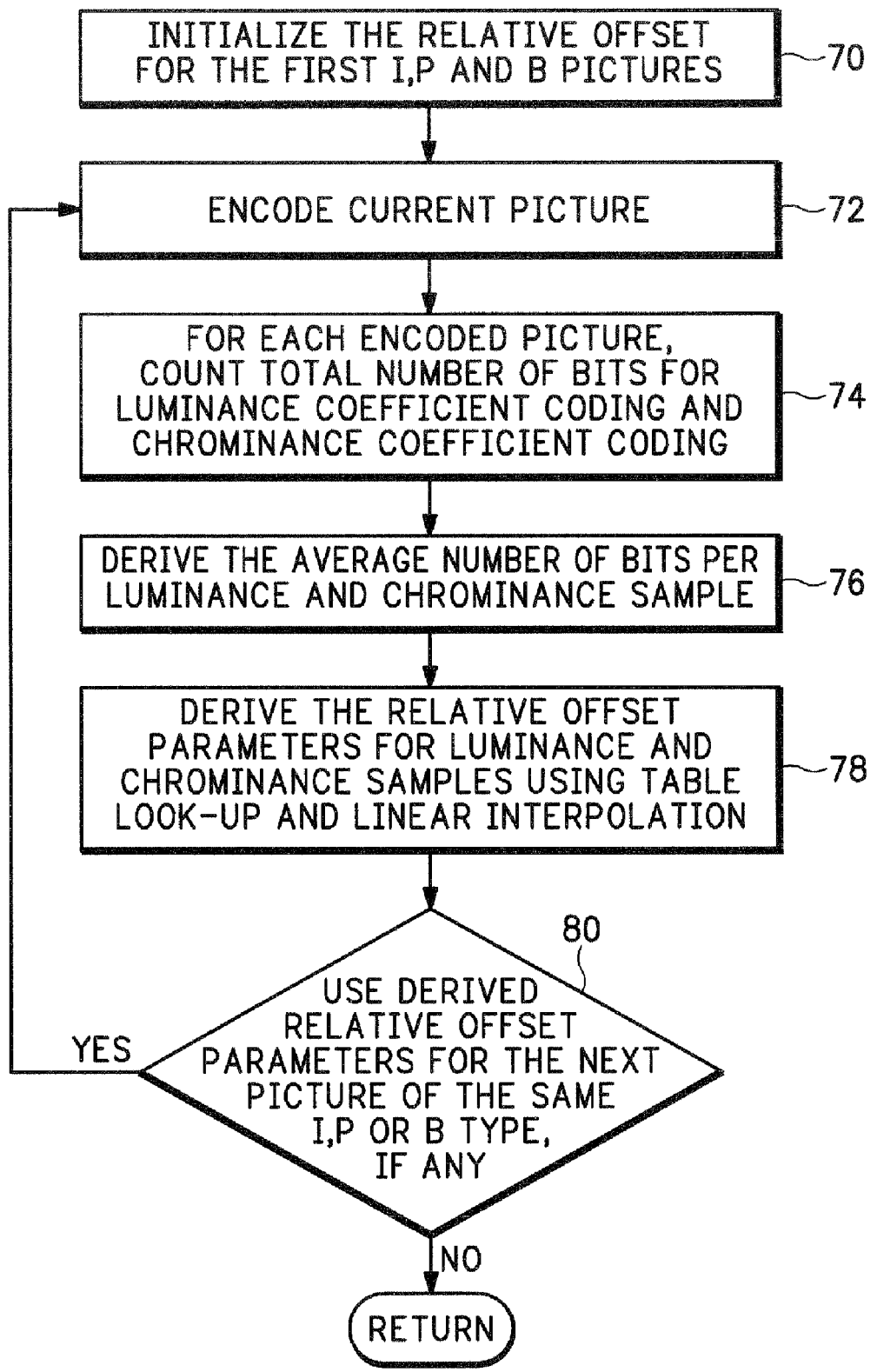
FIG. 5 is a flow diagram showing in more detail one embodiment of the relative quantization offset scheme.

It should be understood that the different operations for the encoders shown in FIGS. 4 and 5 may be implemented in any combination of hardware and/or software. For example, the entire encoder 30 or 45 may be implemented in software that is executed on one or more processors. Alternatively, some of the encoder operations may be implemented in separate logic circuitry.

FIG. 5 describes in more detail how the adaptive quantization offset values are generated during H.264 encoding. Again, the same adaptive quantization scheme can be used for other encoders. In operation 70, the relative offset is initialized for the first Intra (I), Predictive (P), and Bi-directionally predicted (B) pictures. For example, a value of ⅓ may be initialized for the first I picture and a value of ⅙ initialized for the first P and B pictures. The I pictures are Intra coded pictures where macroblocks are coded without prediction. The I pictures are needed to allow a receiver to have a "starting point" for prediction after a channel change and to recover from errors.

The P pictures are predicted pictures that have macroblocks that may be coded with forward prediction from references made from previous I and P pictures or may be intra coded. The B pictures are bi-directionally predicted pictures that have macroblocks that may be coded with forward prediction from previous I or P references, backward prediction from next I or P reference, interpolated prediction from past and future I or P references, or intra coded (no prediction).

In operation 72, the current picture is encoded, for example, as described above in FIG. 4. In operation 74, the total number of bits are counted for each luminance coefficient coding and chrominance coefficient coding for each picture, respectively. In operation 76, the average number of bits are derived for luminance and chrominance samples.

In operation 78, the relative quantization offset parameters are derived for the luminance and chrominance samples. For example, the offset values are identified in the look-up table 34 (FIGS. 3 and 4) that most closely match the average number of bits derived for the luminance and chrominance samples. The final adapted quantization offset values are then derived from the offset values identified in the look-up table using linear interpolation. If there are more frames to process in operation 80, the derived adapted quantization offset parameters for the luminance and chrominance are used for the next picture of the same I, P, or B type.

Figure 6:
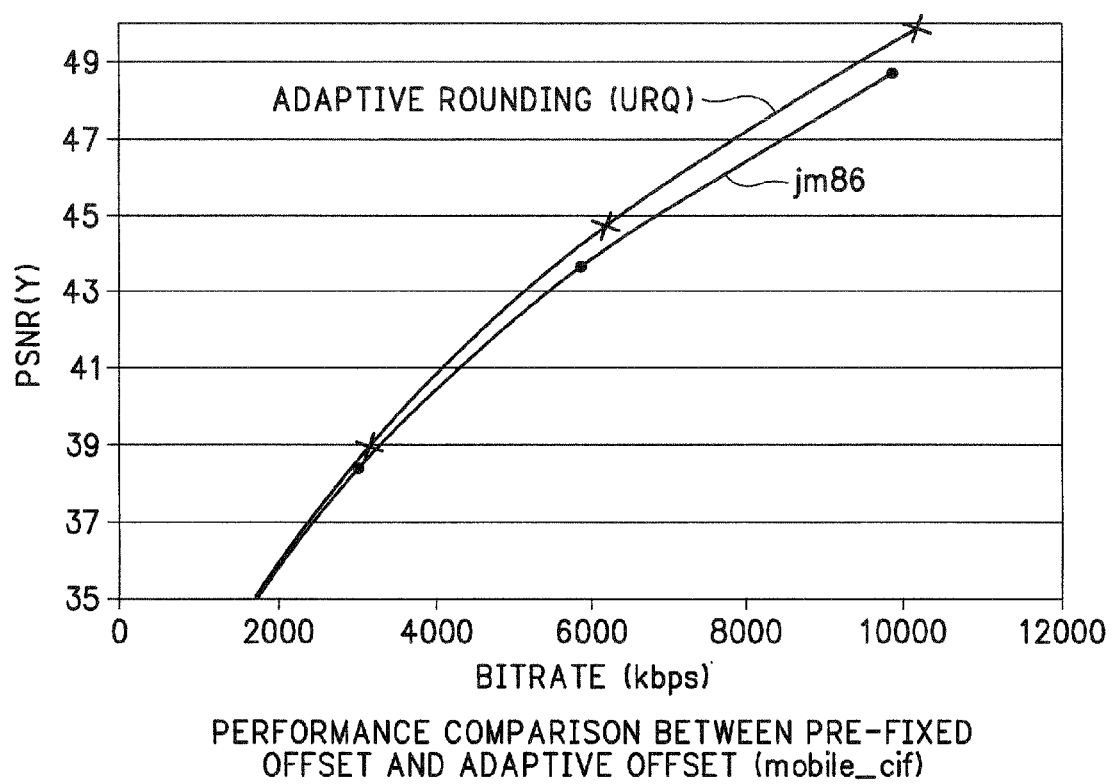
FIGS. 6 and 7 are graphs showing sample results for encoders using the relative quantization offset scheme.
Figure 7:
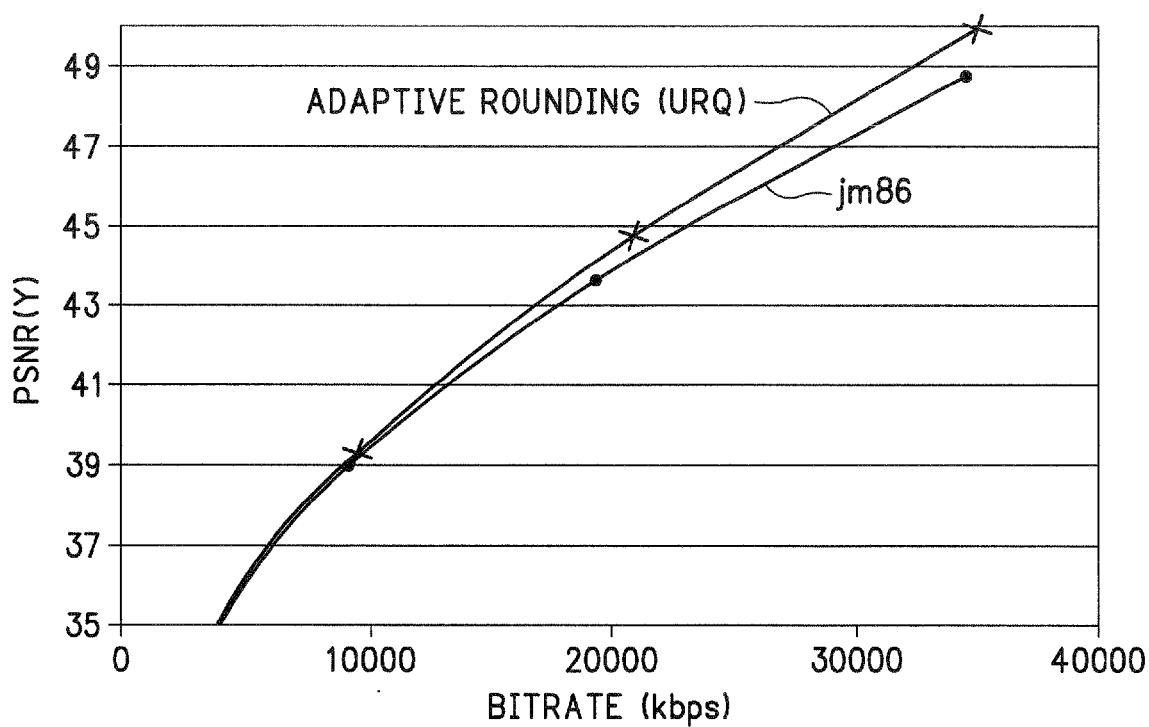

Thus, the adaptive quantization offset scheme can be integrated with H.264 JM8.6. Some encoding performance results are shown in the rate-distortion curves shown in FIGS. 6 and 7. The adaptive quantization offset scheme can also be directly applied to compression systems other than H.264. For example, the adaptive offset scheme can be used whenever a URQ is applied and the input signals are close to Laplacian sources. If the input signals do not closely follow a Laplacian distribution, the same framework could also be applied when a one-to-one relationship is established between the relative quantization offset and the number of bits per sample.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An encoder, comprising:
    encoder circuitry to identify entropy values associated with input data and dynamically identify relative quantization offset values associated with the identified entropy, the encoder circuitry to encode the same or other input data using the dynamically identified relative quantization offset values; and
    a quantization offset look-up table to associate the identified entropy values with the different relative quantization offset values, the encoder circuitry to use the identified entropy values as inputs to the lookup table and to use the associated relative quantization offset values output from the look-up table to adjust quantization threshold values when quantizing the input data.

2. The encoder according to claim 1 wherein the input data includes video pictures and the encoder circuitry determines the entropy for a current video picture and uses the associated relative quantization offset value for quantizing a next video picture.

3. The encoder according to claim 1 wherein the video pictures include I, P, or B type luminance and chrominance frames and the encoder circuitry derives an average number of bits used for coding samples of the luminance and chrominance frames, identifies relative quantization offset values associated with the derived average number of bits, and uses the identified relative quantization offset values for the luminance and chrominance frames for a next picture of the same I, P, or B type.

4. The encoder according to claim 1 wherein the processing circuitry identifies the entropy values by encoding the input data and determining an average number of bits used for encoding a sample of the encoded input data.

5. The encoder according to claim 4 wherein the processing circuitry uses a Uniform-Reconstruction-Quantizer (URQ) when encoding the input data and applies the same relative quantization offset values to each uniform quantization step size in the URQ.

6. The encoder according to claim 1 wherein the processing circuitry uses the relative quantization offset values when encoding data using a H.264 compression scheme.

7. A method for quantizing data, comprising:
encoding a current picture;
identifying an amount of signal variance while encoding the current picture;
accessing a look-up table, populated with relative quantization offset parameters associated with different amounts of signal variance, to identify a relative quantization offset parameter associated with the identified amount of signal variance; and
using the identified relative quantization offset parameter from the look-up table to adjust quantization threshold values when encoding a next picture.

8. The method according to claim 7 including:
identifying an amount of signal variance by identifying a number of bits required for encoding current I, P or B type luminance and chrominance frames;
deriving the relative quantization offset values for both the current luminance and chrominance frames according to the identified number of bits; and
using the derived relative quantization offset values for quantizing the next I, P or B pictures of the same type.

9. The method according to claim 8 including:
using predetermined quantization offset values for first I, P, and B pictures;
encoding the first I, P, and B pictures using the predetermined quantization offset values;
dynamically deriving relative quantization offset values for the first I, P, and B pictures; and
using the dynamically derived relative quantization offset values for the next I, P, and B pictures.

10. The method according to claim 7 including:
storing different relative quantization offset values in the look-up table according to an associated average number of encoded data bits per sample;
identifying a number of bits required for encoding the current picture;
deriving an average number of bits per sample for the encoded current picture;
using the derived average number of bits per sample as an input into the look-up table; and
using the relative quantization offset value output from the look-up table for quantizing the next picture.

11. The method according to claim 10 including:
transforming the current picture into transform coefficients;
deriving the average number of bits used for encoding the transform coefficients; and
using the derived average number of bits to identify the relative quantization offset value for the next picture.

12. The method according to claim 7 including:
identifying an entropy value for the current picture;
normalizing the entropy value by a predetermined static quantization step size; and
using the normalized entropy value as the relative quantization offset value for the next picture.

13. An electronic medium including instructions that, when executed by a processor, cause the processor to:
encode a current picture;
identify an amount of signal variance while encoding the current picture;
access a look-up table, populated with relative quantization offset parameters associated with different amounts of signal variance, to identify a relative quantization offset parameter associated with the identified amount of signal variance; and
use the identified relative quantization offset parameter from the look-up table to adjust quantization threshold values when encoding a next picture.

14. The electronic medium according to claim 13 including instructions that, when executed by the processor, cause the processor to:
identify an amount of signal variance by identifying a number of bits required for encoding current I, P or B type luminance and chrominance frames;
derive the relative quantization offset values for both the current luminance and chrominance frames according to the identified number of bits; and
use the derived relative quantization offset values for quantizing the next I, P or B pictures of the same type.

15. The electronic medium according to claim 14 including instructions that, when executed by the processor, cause the processor to:
use predetermined quantization offset values for first I, P, and B pictures;
encode the first I, P, and B pictures using the predetermined quantization offset values;
dynamically deriving relative quantization offset values for the first I, P, and B pictures; and
use the dynamically derived relative quantization offset values for the next I, P, and B pictures.

16. The electronic medium according to claim 13 including instructions that, when executed by the processor, cause the processor to:
store different relative quantization offset values in the look-up table according to an associated average number of encoded data bits per sample;
identify a number of bits required for encoding the current picture;
derive an average number of bits per sample for the encoded current picture;
use the derived average number of bits per sample as an input into the look-up table; and
use the relative quantization offset value output from the look-up table for quantizing the next picture.

17. The electronic medium according to claim 16 including instructions that, when executed by the processor, cause the processor to:
transform the current picture into transform coefficients;
derive the average number of bits used for encoding the transform coefficients; and
use the derived average number of bits to identify the relative quantization offset value for the next picture.

18. The electronic medium according to claim 13 including instructions that, when executed by the processor, cause the processor to:
identify an entropy value for the current picture;
normalize the entropy value by a predetermined static quantization step size; and
use the normalized entropy value as the relative quantization offset value for the next picture.

* * * * *